(12) United States Patent
Mimberg et al.

(10) Patent No.: US 8,635,480 B1
(45) Date of Patent: Jan. 21, 2014

(54) METHOD AND APPARATUS FOR CONTROLLING POWER TO A PROCESSING UNIT

(75) Inventors: Ludger Mimberg, San Jose, CA (US); David G. Reed, Saratoga, CA (US); David Wyatt, San Jose, CA (US); Gary D. Hicok, Mesa, AZ (US); Rambod Jacoby, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 832 days.

(21) Appl. No.: 12/037,879

(22) Filed: Feb. 26, 2008

(51) Int. Cl.
*G06F 1/32* (2006.01)

(52) U.S. Cl.
USPC ............ 713/324; 713/300; 713/320; 713/323

(58) Field of Classification Search
USPC .................................. 713/300, 320, 323, 324
See application file for complete search history.

(56) References Cited

U.S. PATENT DOCUMENTS

| | | | | |
|---|---|---|---|---|
| 5,689,714 | A * | 11/1997 | Moyer | 713/310 |
| 5,737,171 | A * | 4/1998 | Buller et al. | 361/103 |
| 2006/0007203 | A1* | 1/2006 | Chen et al. | 345/204 |
| 2006/0236139 | A1* | 10/2006 | Chang et al. | 713/300 |
| 2007/0283175 | A1* | 12/2007 | Marinkovic et al. | 713/320 |
| 2009/0006857 | A1* | 1/2009 | Cheng | 713/183 |
| 2009/0153528 | A1* | 6/2009 | Orr | 345/204 |

OTHER PUBLICATIONS

"The Authoritative Dictionary of IEEE Standards Terms", 7th Edition, Dec. 2000, Institute of Electrical and Electronics Engineers, Inc., p. 128.*

* cited by examiner

*Primary Examiner* — Paul Yanchus, III
(74) *Attorney, Agent, or Firm* — Patterson + Sheridan, L.L.P.

(57) ABSTRACT

In a computer system with multiple processing units, power to one or more of the processing units is turned off while the other processing units remain powered on. The processing unit that is powered off may be a GPU on a graphics adapter card, and power to this GPU is controlled by turning on and off the power supplied through a voltage regulator. With this configuration, power to the GPU on the graphics adapter card can be turned off when it is not in use or when it is being used for graphics processing that another graphics processor can handle.

15 Claims, 4 Drawing Sheets

METHOD AND APPARATUS FOR CONTROLLING POWER TO A PROCESSING UNIT

BACKGROUND OF THE INVENTION

1. Field of the Invention

The present invention relates generally to power control and, more particularly, to controlling power to processors, such as graphics processing units.

2. Description of the Related Art

In computer systems with multiple processors, power is continuously supplied to each of the processors even though one or more of the processors are idle. This results in unnecessary power consumption because of chip leakage, use of extra local memory and an additional intermediary bus, dedicated voltage regulation, and cooling. The chip leakage problem is expected to worsen as chip's silicon process geometry continues to shrink to allow the chip's operating clock frequency to increase.

One example of a computer system with multiple processors is one that employs a discrete graphics adapter card. In this computer system, there is one GPU on a motherboard or integrated with a central processing unit (CPU), and another GPU on the discrete graphics adapter card. Typically, the GPU on the card is faster and has better display capabilities. However, the GPU on the discrete graphics adapter card causes an increase in power consumption of the overall system, even when it is idle, for the aforementioned reasons.

A GPU on a discrete graphics adapter card is normally powered through voltage supply rails of the card, and turning off the power to the card is difficult for several reasons. First, the voltage supply rail to the discrete graphics adapter card needs to be separated from the voltage supply rails to other cards since expansion card slots normally share voltage supply rails. Second, expensive high-current and/or fast-switch devices need to be implemented to provide on/off power control for the discrete graphics adapter card. This functionality cannot be provided by existing components, namely the computer system power supply, because the computer system power supply do not provide on/off control except for the whole system.

Current computer systems employ means to control power to CPUs and GPUs in order to support various sleep states. For example, notebook computers have used controllers, such as an embedded controller or a keyboard controller, and system software in order to support sleep states of the GPU such as suspend and low power D3-cold. However, even when a processor is in a sleep state, power is still consumed and, for higher performance processors, chip leakage becomes substantial.

SUMMARY OF THE INVENTION

Embodiments of the invention provide methods and apparatus for controlling power to a processor in a multi-processor computer system. In one embodiment, power to a GPU on a graphics adapter card is controlled through the use of a controller that resides on the graphics adapter card.

A graphics adapter card for a computer system, according to an embodiment of the invention, includes a GPU coupled to a first power source, e.g., main power rails of the graphics adapter card, and a controller that is coupled to a second power source, e.g., an auxiliary power rail from a bus of the computer system, and configured to control power supplied to the GPU from the first power source. The graphics adapter card further includes a voltage regulator that turns off the power supplied to the GPU from the first power source under control of the controller.

A computer system, according to an embodiment of the invention, includes a first processing unit, which may be a GPU, a second processing unit, which may be a GPU, a voltage regulator connected between the second processing unit and a power source, and a controller configured to control power supplied to the second processing unit from the power source through the voltage controller. In one embodiment, power supplied to a GPU is turned off when a different GPU is rendering graphics.

A method for controlling power to a GPU of a computer system having more than one GPU, according to an embodiment of the invention, includes the steps of generating a display output using a first GPU, and powering off a second GPU while power to the first GPU remains on. In one embodiment, the second GPU is mounted on a graphics adapter card, and a command is issued by a motherboard controller of the computer system to a local controller that resides on the graphics adapter card, and in response, the local controller controls a voltage regulator that is supplying power to the second GPU, to turn off the power supplied to the second GPU.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide methods and apparatus for controlling power to a processor in a multi-processor computer system. In the embodiments described below, the invention is illustrated using a multi-GPU system. However, the invention is applicable to any multi-processor system.

Figure 1:
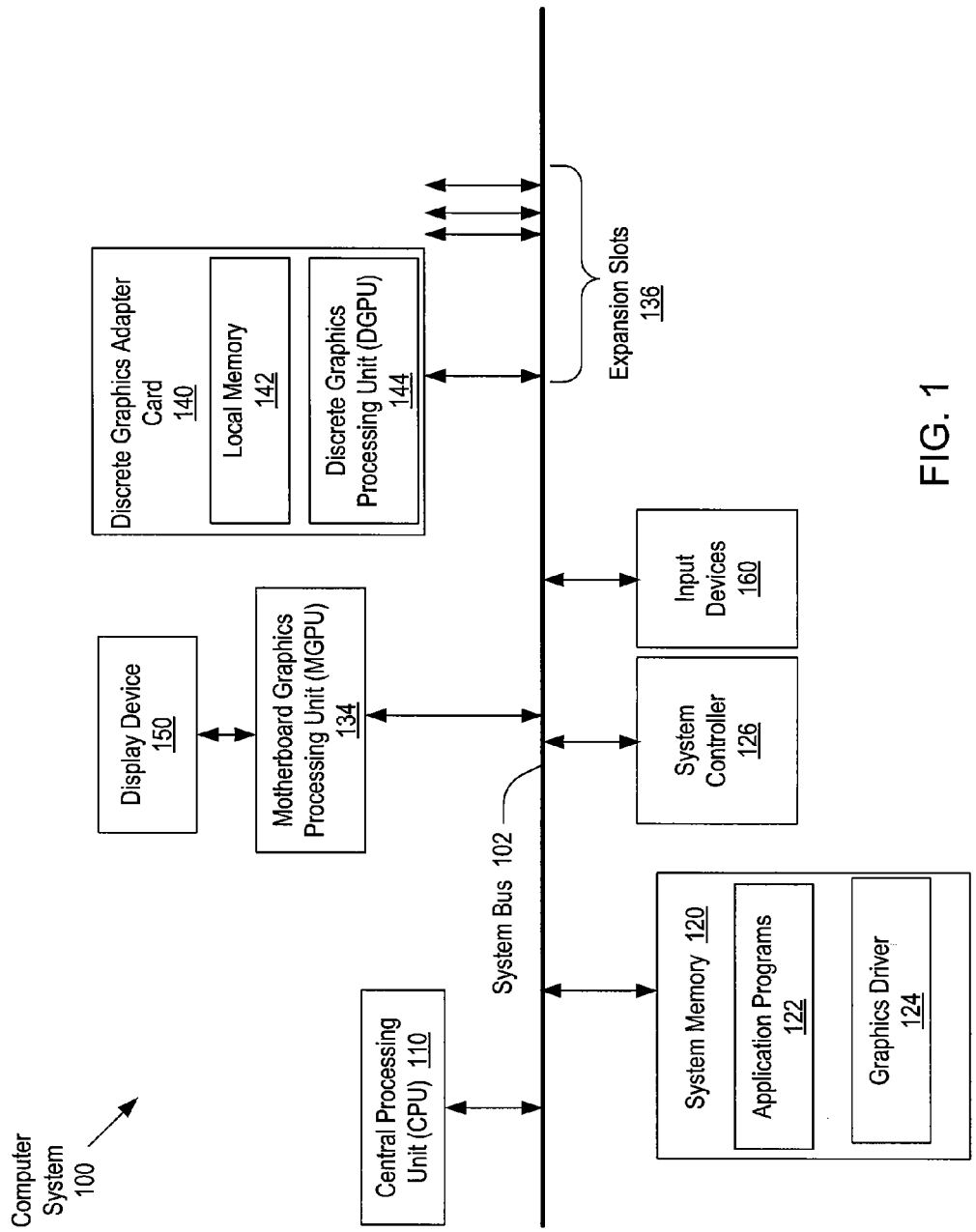
FIG. 1 is a conceptual diagram of a computer system in which one or more aspects of the invention may be implemented.

FIG. 1 is a conceptual diagram of a computer system 100 in which one or more aspects of the invention may be implemented. As shown, the computer system 100 includes a central processing unit (CPU) 110, a system memory 120, a system controller 126, a motherboard GPU (MGPU) 134, a plurality of expansion slots 136, in one of which a discrete graphics adapter card 140 is inserted, a display device 150, and input devices 160.

The CPU 110 and the MGPU 134 are shown separately in FIG. 1, but they may be parts of a single chip. The discrete graphics adapter card 140 includes local memory 142 and discrete graphics processing unit (DGPU) 144. The system memory 120 is implemented as a dynamic random access memory (DRAM) and stores application programs 122 and drivers, such as graphics driver 124, that are executed by the CPU 110. The graphics driver 124 includes a driver for MGPU 134 and a driver for DGPU 144. The display device 150 is an output device capable of displaying a visual image corresponding to a graphics image generated using either MGPU 134 or DGPU 144. In some configurations, an additional display device may be separately connected to a high definition multimedia interface (HDMI) provided on the graphics adapter card 140.

Communication paths interconnecting the components of the computer system 100 shown in FIG. 1 are implemented with a bus 102, but any suitable bus or point-to-point communication protocol(s) known in the art may be used. The communication paths to and from the graphics adapter card 140 are implemented with a PCI Express (PCIe) bus and an SMbBus that is available on the PCIe bus. The system controller 126 controls the communication through the bus 102 and between the components of the computer system 100 shown in FIG. 1.

Figure 2:
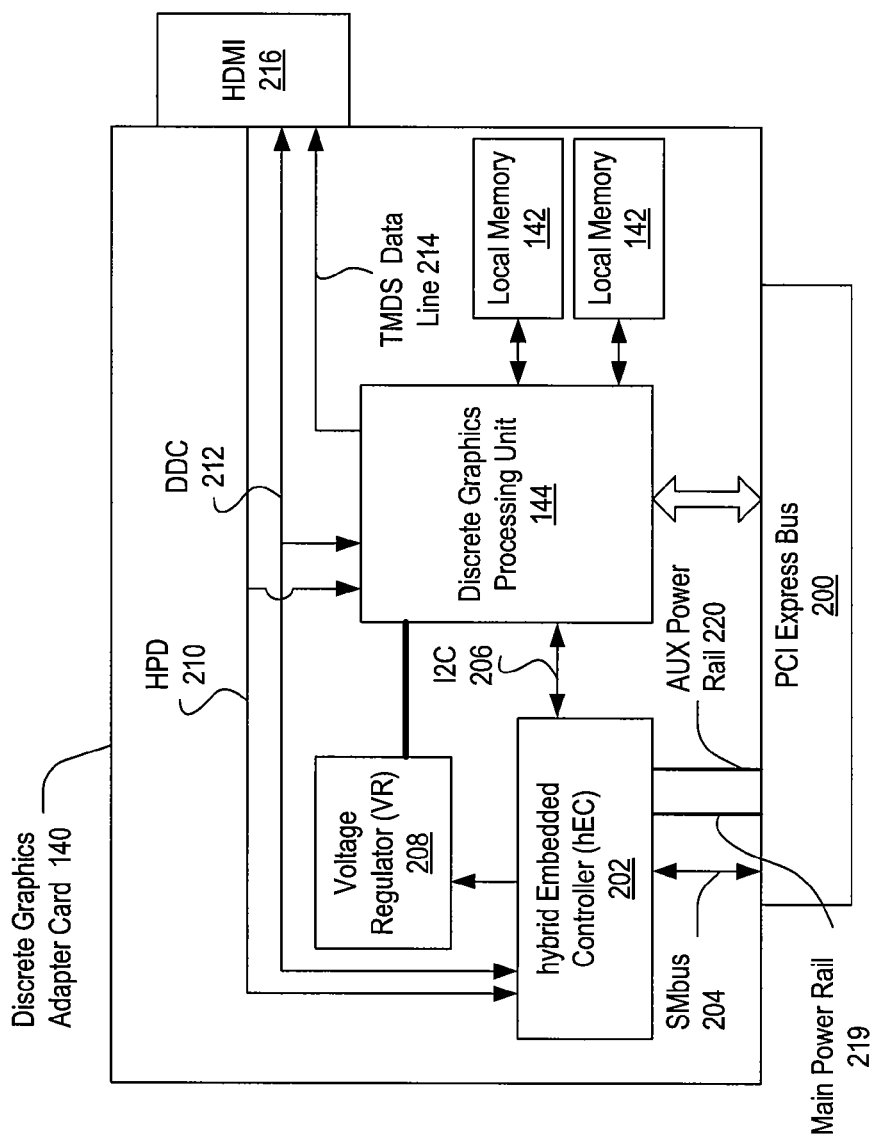
FIG. 2 is a simplified block diagram of the discrete graphics adapter card of FIG. 1.

FIG. 2 is a simplified block diagram of the discrete graphics adapter card 140. The discrete graphics adapter card 140 is configured to be plugged into an expansion slot of the computer system 100 that is configured as a PCIe slot. This slot provides power to the discrete graphics adapter card 140 and connects the discrete graphics adapter card 140 to a PCIe bus 200 of the computer system 100. The DGPU 144 is mounted on the discrete graphics adapter card 140 and communicates with other components of the computer system 100, such as system controller 126 via the PCIe bus 200. A hybrid embedded controller (hEC) 202 is also mounted on the discrete graphics adapter card 140. The hEC 202 receives power from a main power rail 219 of the discrete graphics adapter card 140 and, when the main power rails on the discrete graphics adapter card 140 are cut off, via the PCIe bus 200 through an auxiliary power rail 220. In addition, when the main power rails on the discrete graphics adapter card 140 are cut off, the hEC 202 receives signals from the system controller 126 of the computer system 100 through an SMbus 204, which is available on the PCIe bus 200. It is noted that the hEC 202 may receive signals from the system controller 126 of the computer system 100 through any communication bus so long as such communication bus remains powered on even after the main power rails on the discrete graphics adapter card 140 are powered off.

The discrete graphics adapter card 140 further includes local memory 142, HDMI 216, and a voltage regulator (VR) 208. The VR 208 is connected to the main power rails of the discrete graphics adapter card 140 and is controlled by the hEC 202. Display outputs of the DGPU 144 are transmitted through a TMDS (Transmission Minimized Differential Signaling) line 214 to the HDMI 216. A HPD (Hot-Plug Detect) line 210 and a DDC (Digital Data Channel) 212 connect the HDMI 216 to the DGPU 144 and the hEC 206. The HPD line 210 and DDC 212 are used to detect changes in the display device that is attached to the HDMI 216. When power to the main power rails of the discrete graphics adapter card 140 is on, DGPU 144 performs this function. However, when power to the main power rails of the discrete graphics adapter card 140 is cut off, the hEC 202 performs this function.

It is noted that when power to the main power rails of the discrete graphics adapter card 140 is cut off, several components of the discrete graphics adapter card 140 remains powered. They include the PCIe connector, through which PCIe bus 200 and SMbus 204 remain powered, the hEC 202 which remains powered through auxiliary power rail 220, and a 5-volt power source for the hot plug detect.

Figure 3:
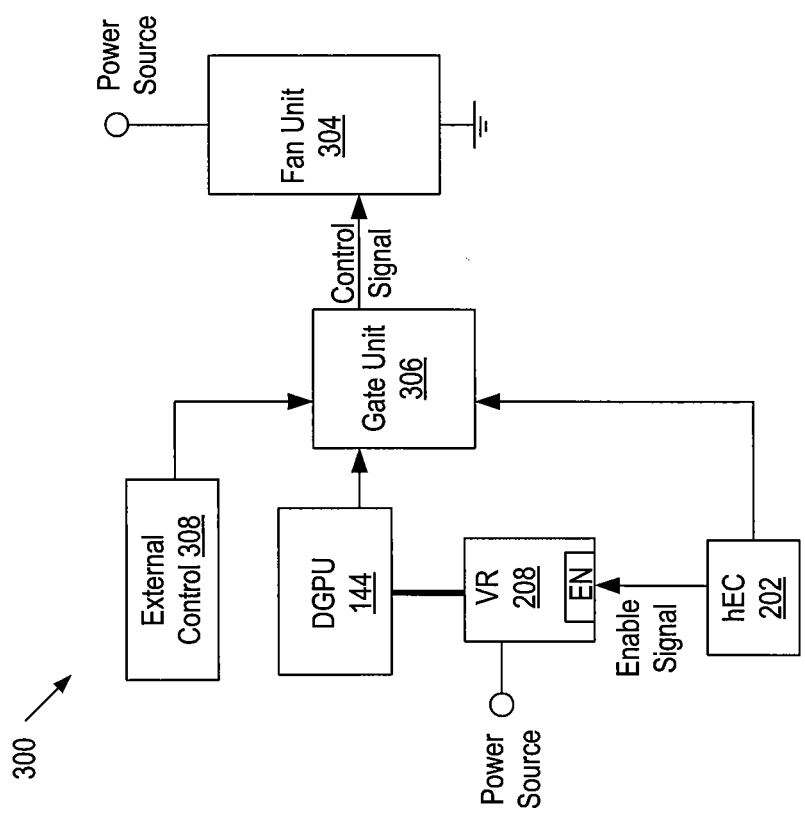
FIG. 3 illustrates in a schematic diagram how power is controlled in the discrete graphics adapter card of FIG. 1.

FIG. 3 illustrates in a schematic diagram how the hEC 202 controls the VR 208 to control power that is supplied to the discrete graphics adapter card 140. The hEC 202 is a device that receives commands from the system controller 126 and issues an enable signal to the VR 208 when the system controller 126 instructs the hEC 202 to turn on the power to the discrete graphics adapter card 140. When the system controller 126 instructs the hEC 202 to turn off the power to the discrete graphics adapter card 140, the hEC 202 removes the enable signal to the VR 208.

The discrete graphics adapter card 140 further includes a fan unit 304 that is powered from a power source that is different from the main power rails of the discrete graphics adapter card 140. The fan unit 304 operates when it is supplied a control signal, such as a pulse width modulation (PWM) signal. The control signal may be generated by an external control unit 308 or DGPU 144. When the system controller 126 instructs the hEC 202 to power off the discrete graphics adapter card, the hEC 202 blocks the control signal from being supplied to the fan unit 304 using a gate unit 306 and thus causes the fan unit 304 to shut down.

It is noted that only one voltage regulator 208 is shown in FIG. 3 for simplicity. However, it should be apparent to those of ordinary skill that multiple voltage regulators are used in the discrete graphics adapter card 140 to supply different levels of power to various electronic components on the discrete graphics adapter card 140. For example, a chain of voltage regulators are used to control the power to local memories 142. These voltage regulators are controlled by enable signals issued by the hEC 202 in the same manner as described above in conjunction with the VR 208.

The hEC 202 remains powered on through the auxiliary power line 220 even when power to other components of the discrete graphics adapter card 140 has been turned off, and allows the hEC 202 to carry out functions during this period. Such functions include issuing enable signals to the VR 208 and the PWM unit 306 to power on the components of the graphics adapter card 140 and the fan unit 304, and detecting a change in display configuration based on signals on the HPD line 210 or DDC 212.

Figure 4:
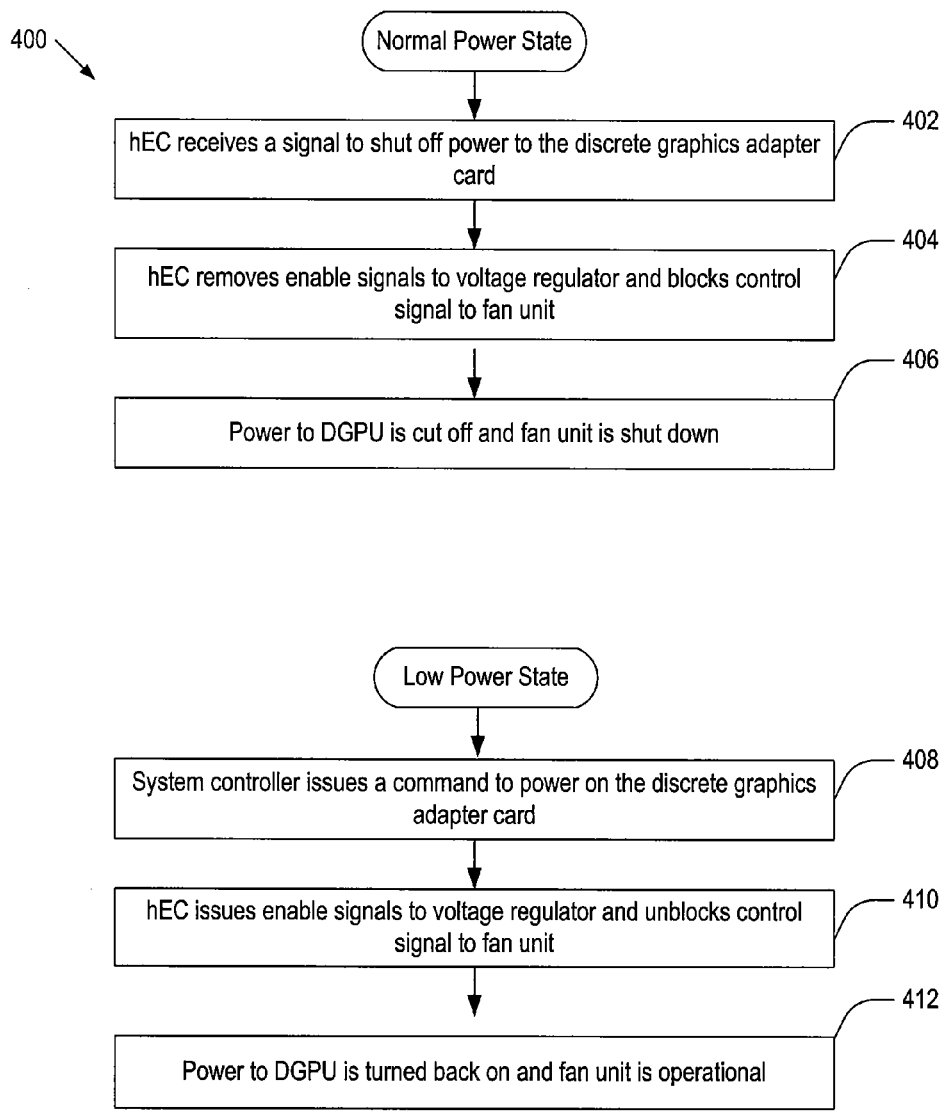
FIG. 4 are flow diagrams illustrating steps that are carried out to control power in the discrete graphics adapter card of FIG. 1.

FIG. 4 are flow diagrams illustrating steps that are carried out to control power in a discrete graphics adapter card of FIG. 1. By carrying out steps 402-406, the computer system 100 operating in a normal power state goes into a lower power state. In step 402, the hEC 202 receives a signal to shut off power to the discrete graphics adapter card 140. This signal may be transmitted from the system controller 126 to the hEC 202 via the SMbus 204 or via the PCIe bus 200, DGPU 144 and I2C bus 206. This signal is transmitted, for example, when the computer system 100 selects MGPU 134 for graphics rendering, and in conjunction with a signal to use MGPU 134 for graphics rendering. Then, the hEC 202 removes the enable signal to VR 208 and blocks the control signal into the fan unit 304 (step 404) and thereby causes the DGPU 144 to power off and the fan unit 304 to shut down (step 406). Upon completion of step 406, the system 100 enters the low power state.

By carrying out steps 408-412, the computer system 100 operating in a low power state goes into a normal power state. During the lower power state, the system controller 126 communicates with the hEC via the SMbus 204. When the system controller 126 issues a command to power on the discrete graphics adapter card 140 (step 408), the hEC 202 issues enable signals to VR 208 and unblocks the control signal to the fan unit 304 in step 410 and thereby causes the DGPU 144 to power on and the fan unit 304 to be operational (step 412).

Figure 5:
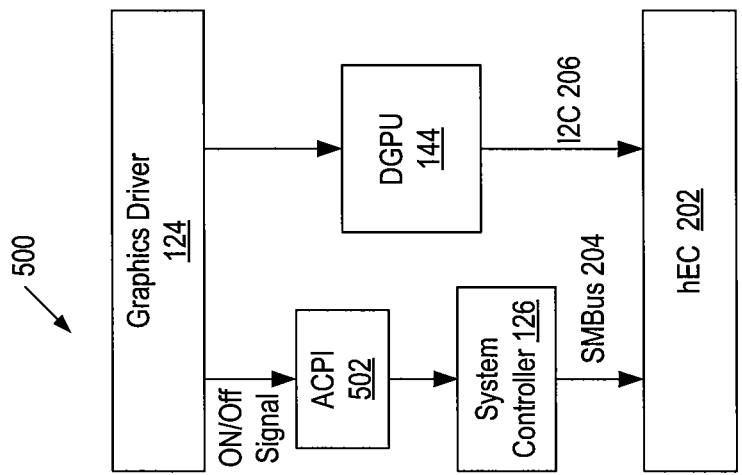
FIG. 5 is a schematic diagram illustrating communication flows to the discrete graphics adapter card in the computer system of FIG. 1.

FIG. 5 is a schematic diagram illustrating control flows in the computer system of FIG. 1. When power to the discrete graphics card 140 has been turned off, or upon reset of the computer system 100, the graphics driver 124 communicates with the hEC 202 through an Advanced Configuration and Power Interface (ACPI) 502 and the system controller 126. When power to the discrete graphics card 140 is on, the graphics driver 124 communicates with the hEC 202 through DGPU 144.

While the foregoing is directed to embodiments of the present invention, other and further embodiments of the invention may be devised without departing from the basic scope thereof, and the scope thereof is determined by the claims.

We claim:

1. A graphics adapter card for a computer system, comprising:
    a main power rail;
    an auxiliary power rail connected to a Peripheral Component Interconnect Express (PCIe) bus;
    a GPU coupled to the main power rail;
    a local controller coupled to the main power rail and the auxiliary power rail and configured to control power supplied to the GPU from the main power rail and to communicate with a motherboard controller that is external to the graphics adapter card via an auxiliary bus; and
    a voltage regulator coupled between the GPU and the local controller,
    wherein the local controller is coupled between the voltage regulator and the main power rail.

2. The graphics adapter card according to claim 1, wherein the voltage regulator turns off power supplied to the GPU from the main power rail under control of the local controller.

3. The graphics adapter card according to claim 2, further comprising a fan, wherein the fan operates when a control signal is supplied thereto, and the control signal is supplied to the fan under control of the local controller.

4. The graphics adapter card according to claim 3, wherein the control signal is a PWM signal supplied from an external unit.

5. The graphics adapter card according to claim 3, wherein the control signal is a PWM signal supplied from the GPU.

6. A computer system comprising:
    a first processing unit;
    a second processing unit coupled to a main power rail;
    a motherboard controller;
    a voltage regulator coupled between the main power rail and the second processing unit; and
    a local controller coupled to the main power rail and an auxiliary power rail connected to a Peripheral Component Interconnect Express (PCIe) bus and configured to control power supplied to the second processing unit from the main power rail and to communicate with the motherboard controller via an auxiliary bus,
    wherein the local controller is connected between the voltage regulator and the main power rail, and the voltage regulator is configured to turn off power supplied to the second processing unit from the main power rail under control of the local controller while the first processing unit is operational.

7. The computer system according to claim 6, wherein the first processing unit is a first GPU and the second processing unit is a second GPU, and power supplied to the second GPU is turned off under control of the local controller when the first GPU is rendering graphics.

8. The computer system according to claim 7, wherein the motherboard controller is configured to issue a command to the local controller to turn off power supplied to the second GPU when the first GPU is rendering graphics.

9. The computer system according to claim 6, further comprising a graphics adapter card on which the second processing unit, the voltage regulator, and the local controller are mounted, wherein the graphics adapter card includes the main power rail and the auxiliary power rail.

10. The computer system according to claim 9, wherein the graphics adapter card further includes a fan and the fan is shut down under control of the local controller.

11. In a computer system including a first GPU, a second GPU, and a voltage regulator coupled to the second GPU, a method for controlling power to the second GPU, comprising:
    generating a display output using the first GPU; and
    issuing a command from a motherboard controller to a local controller via an auxiliary bus,
    wherein the local controller is coupled to a main power rail and an auxiliary power rail connected to a Peripheral Component Interconnect Express (PCIe) bus and configured to power off the second GPU coupled to the main power rail based on the command while power to the first GPU remains on, and the local controller is coupled between the voltage regulator and the main power rail.

12. The method according to claim 11, wherein the local controller turns off power supplied to the second GPU via the voltage regulator, wherein the voltage regulator is included on a graphics adapter card with the second GPU and the local controller.

13. The method according to claim 12, further comprising causing a fan included on the graphics adapter card to be shut down by the local controller based on the command.

14. The method according to claim 11, further comprising issuing another command from the motherboard controller to the local controller to turn on power to the second GPU after the power to the second GPU has been turned off.

15. The method according to claim 14, wherein the local controller issues an enable signal to the voltage regulator coupled between the main power rail and the second GPU based on the another command from the motherboard controller.

* * * * *